Aug. 20, 1946.　　D. W. KELBEL　　2,406,225
TRANSMISSION
Filed Aug. 3, 1944　　2 Sheets-Sheet 1
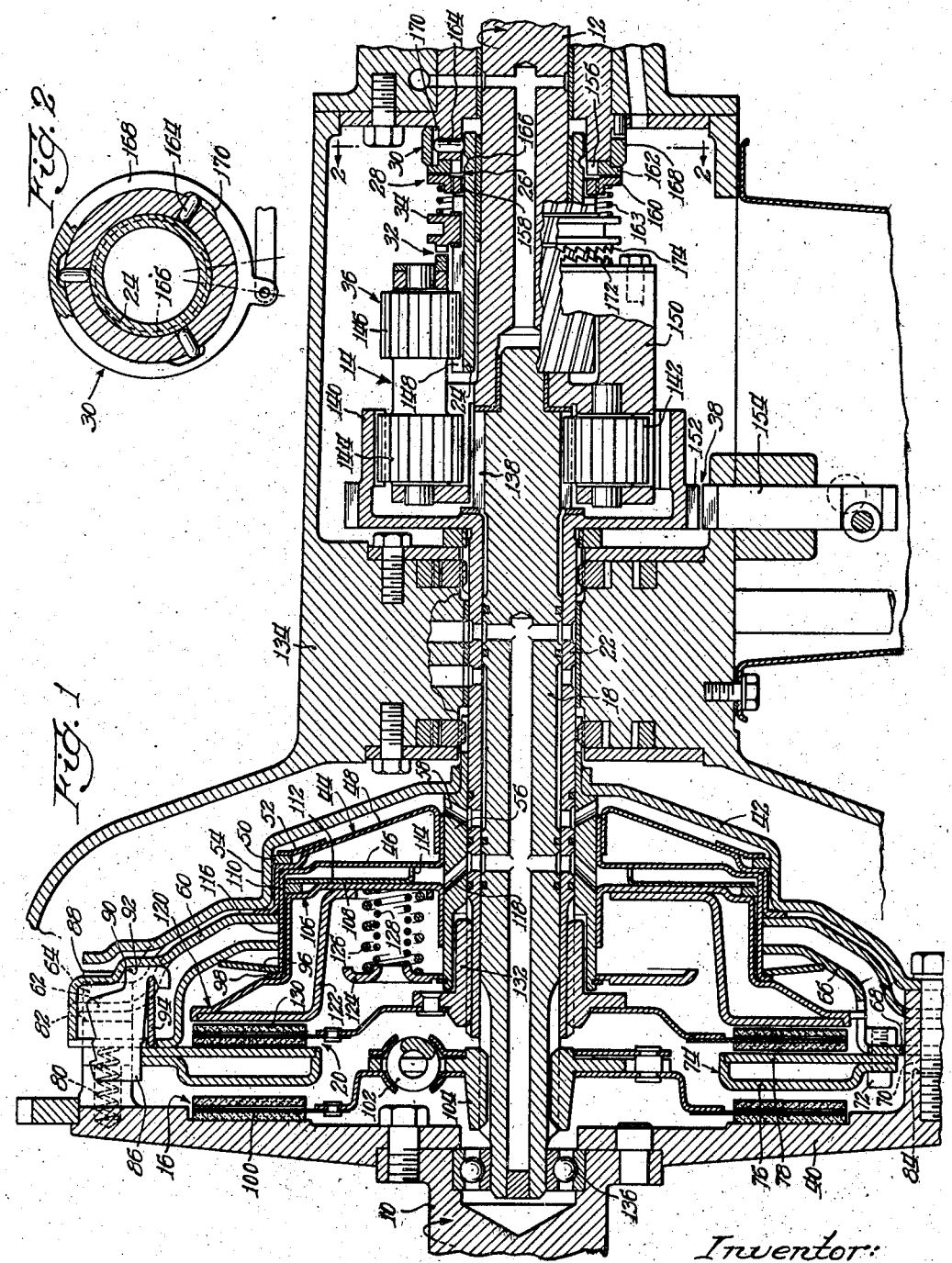
Inventor:
Donald W. Kelbel

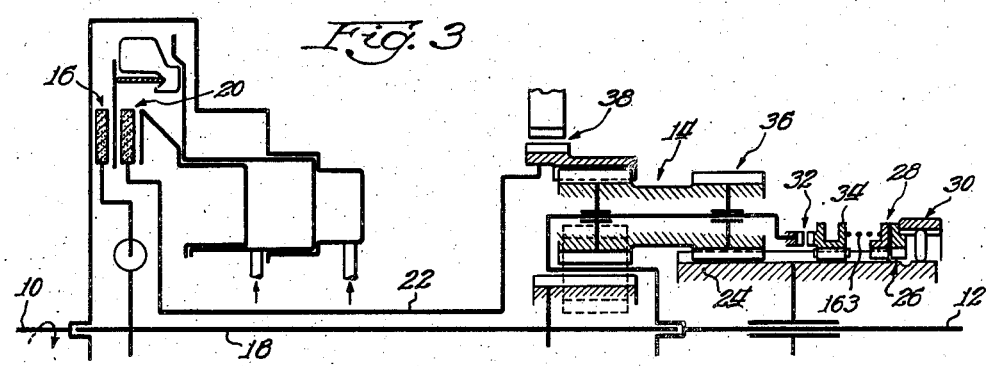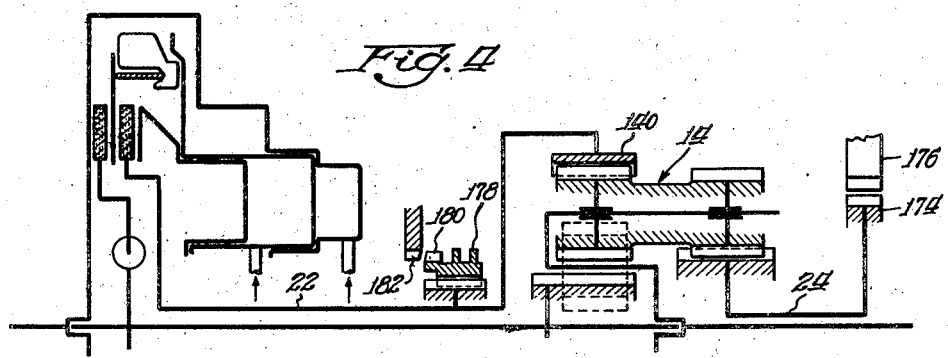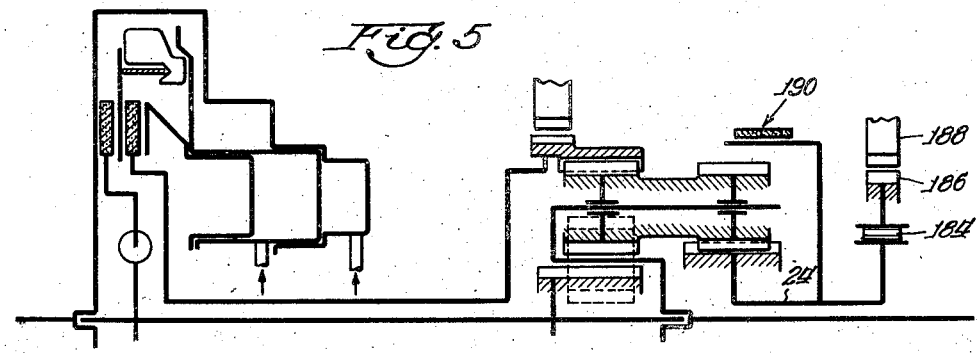

Patented Aug. 20, 1946

2,406,225

UNITED STATES PATENT OFFICE 2,406,225

TRANSMISSION

Donald W. Kelbel, Muncie, Ind., assignor to Borg-Warner Corporation, Chicago, Ill., a corporation of Illinois Application August 3, 1944, Serial No. 547,819

2 Claims. (Cl. 74—270)

My invention relates to power transmissions, and more particularly to transmissions suitable for use in automotive vehicles.

It is an object of my invention to provide an improved transmission which is of such construction that a suitable number of speed ratios for driving an automotive vehicle may be obtained with a minimum amount of gearing.

It is another object of my invention to provide an improved transmission which may be easily controlled for changing the speed ratio through the transmission.

It is a further object of my invention to provide an improved transmission having low and intermediate speed ratios in which, at the will of the operator, the driven shaft may either freewheel with respect to the drive shaft or in which the two shafts may be positively connected. It is contemplated that the transmission shall preferably provide a direct drive ratio positively connecting the drive and driven shafts.

It is still another object of the invention to provide such a transmission which may be easily controlled so that the driven shaft may drive the drive shaft at one of the lower speed ratios of the transmission for starting an internal combustion driving engine connected with the drive shaft.

The invention consists of the novel constructions, arrangements and devices to be hereinafter described and claimed for carrying out the above stated objects and such other objects as will appear from the following description of certain preferred embodiments illustrated in the accompanying drawings, wherein:

Fig. 1 is a longitudinal sectional view of a transmission embodying the principles of the invention;

Fig. 2 is a sectional view taken on line 2—2 of Fig. 1;

Fig. 3 is a diagrammatic illustration of the transmission shown in Fig. 1;

Fig. 4 is a diagrammatic illustration of another embodiment of the invention; and Fig. 5 is a diagrammatic illustration of a third embodiment of the invention.

Like characters of reference designate like parts in the several views.

Referring now to Figs. 1 to 3, and in particular to Fig. 3, the transmission illustrated therein comprises briefly, a drive shaft 10, a driven shaft 12, a planetary gear set 14 connected to drive the shaft 12, a centrifugal clutch 16 for connecting the drive shaft 10 with the planetary gear set by means of an intermediate shaft 18, and another clutch 20 for connecting the drive shaft 10 with the planetary gearing by means of another intermediate shaft 22. The planetary gear set 14 comprises a reaction element 24 which when held stationary functions to complete a power train through the planetary gear set between the shafts 10 and 12 when either of the clutches 16 and 20 is engaged. A positive type brake 26 is provided for the reaction element 24, and a blocker 28 allows engagement of the brake 26 only when the reaction element is rotating in a direction reverse with respect to the direction of rotation of the shaft 10. A holding mechanism 30, adapted to be selectively operated, is provided for holding the brake 26 engaged, and a clutch 32 comprising cammed interengaging teeth is disposed between the reaction element 24 and another element of the planetary gearing 14 to lock the elements together and to lock up the gearing for the purposes which will be hereinafter described. The reaction element 24 is movable longitudinally with respect to the shaft 12 either by means of a collar 34 on the reaction element or by means of spiral gearing 36 which is a part of the planetary gear set 14 in order to either engage the brake 26 or the clutch 32. A positive type brake 38 is provided for the shaft 22 and the planetary gearing for providing a reverse drive through the transmission as will be hereinafter described.

Referring now in particular to Figs. 1 and 2 for a more detailed description of the transmission, it will be observed that the two clutches 16 and 20 are positioned closely together and form parts of a single clutch assembly. This assembly comprises a fly-wheel 40 fixed to the shaft 10 to rotate therewith and a rear cover plate 42 which is bolted to the fly-wheel 40. A piston 44 comprising annular sheet metal parts 46 and 48 and also a piston ring 50, held by a retainer ring 52 with respect to the parts 46 and 48, is provided within the cover plate 42. The piston 44 is disposed between a cylindrical portion 54 formed in the cover plate 42 and a sleeve 56 disposed on the shaft 22 and fixed with respect to the cover plate 42. A fluid conduit 58 passing through the shafts 18 and 22 and the sleeve 56 is provided to supply fluid from any suitable source to the rear of the piston 44 and between the piston and the cover plate 42 to force the piston forwardly of the clutch assembly. The piston 44 acts by means of its member 48 on an annular sheet metal member 60 disposed about the member 46. The member 60 has a plurality of lug portions 62 each of which passes through a slot 64 provided in the side of the fly-wheel 40, the arrangement being such that the member 60 may move longitudinally with respect to the clutch assembly. The member 60 bears on the outer edge of an annular sheet metal member 66 which is provided with lug portions 68 passing through appropriate slots 70 provided in the side of the fly-wheel 40 whereby the member 66 may also move longitudinally of the clutch assembly. The member 66 is disposed about the member 46 of the piston 44 and has fixed thereto, by means of screws 72, a pressure plate 74 formed by sheet metal members 76 and 78. A plurality of springs 80 are provided in suitable cavities in the side of the fly-wheel 40 and act on the member 66 for yieldably holding the members 66, 60 and the piston 44 at the rearward limit of movement of these parts with the member 46 of the piston bearing against the cover plate 42 as shown. Each of the slots 64 has a bottom 82 which functions to limit the movement of the member 60 toward the front of the clutch assembly, and each of the slots 70 is provided with a bottom 84 which functions to limit the movement in the same direction of the sheet metal member 66. The parts of the clutch assembly so far described function so that, when fluid under pressure is admitted behind the piston 44, the piston, the parts 60 and 66 and the pressure plate 74 are moved forward until the lugs 62 contact the bottoms 82 of the slots 64.

The clutch 16, after fluid under pressure has been applied to the piston 44 to move the lug portions 62 of the member 60 into contact with the bottoms 82 of the slots 64, is conditioned to be engaged according to the speed of the shaft 10. Centrifugal weights 86 perform this function of centrifugally engaging the clutch. The member 60 is provided with outwardly extending wing or lug portions 88 and each of these portions is provided with a notch 90 in which is received an acute portion 92 of a weight 86, the arrangement being such that the notch 90 acts as a fulcrum for the weight, allowing the weight to move outwardly under the influence of centrifugal force due to rotation of the shaft 10, the fly-wheel 40, the member 60 and thereby the weights 86. Each of the weights is connected by means of a strut 94 with the pressure plate 74, so that as the weight 86 moves outwardly, the weight tends to separate the members 60 and 66 and move the pressure plate 74 toward the fly-wheel 40. A washer type spring 96 is disposed between the member 66 and a flange 98 on the end of the member 46, and the spring 96 is thus so disposed as to yieldingly oppose such forward movement of the pressure plate 74 due to outward movement of the weights 86, and as will be apparent, such movement of the pressure plate 74 is also similarly opposed by the springs 80. The clutch 16 comprises, in addition to the fly-wheel 40 and the pressure plate 74, the driven plate 100 which is connected by means of a vibration absorbing unit 102 of any suitable construction with a hub 104 which is splined to the shaft 18. The weights 86 function, after fluid under pressure has been applied to the piston 44 to move the piston and the associated parts so that the member 60 contacts the bottoms 82 of the slots 64 for conditioning the clutch 16 for engagement, to move the pressure plate 74 the additional distance needed to engage the clutch 16.

A piston 106 is provided for engaging the clutch 20. This piston comprises a member 108 of sheet metal, a piston ring 110 of a yielding material, and a sheet metal retainer member 112. The member 112 holds the ring 110 in place with respect to the member 108, and it has a perforated flange 114 functioning to space the members 108 and 46. The piston 106 is disposed between and is movable with respect to a cylindrical portion 116 of the member 46 and the sleeve 56. A fluid conduit 118 extending through the sleeve 56 and the shafts 18 and 22 is provided for supplying fluid under pressure from any suitable source to the rear of the piston 106. A pressure plate 120 movable by the piston 106 is formed by the member 108 and an annular member 122, as shown. The sleeve 56 has an annular member 124 fixed thereon against forward movement, and springs 126 and 128 are provided between the member 108 and the member 124. These springs function to yieldingly oppose movement of the piston 106 forwardly, and the springs, together with the springs 80, function also to oppose forward movement of the piston 44 and its associated parts. The clutch 20 comprises, in addition to the pressure plate 74 and the pressure plate 120, a driven clutch disc 130. The disc 130 has a hub 132 that is splined to the shaft 22 so as to be non-rotatable with respect to the shaft but the hub may have longitudinal movement on the shaft. The clutch 20 is engaged by applying fluid under pressure behind the piston 106 through the conduit 118 to move the piston and thereby the pressure plate 120 forwardly whereby the disc 130 is engaged between the pressure plates 120 and 74, and this engagement may take place either with the clutch 16 engaged or disengaged.

It will be observed that the shaft 22 is journaled within the housing 134 of the transmission and the shaft 18 is journaled within the shaft 22. The shaft 18 is piloted with respect to the shaft 10 by means of a bearing 136, and the shaft 18 is also piloted in the driven shaft 12, as shown. The shaft 18 has a sun gear 138 formed thereon, and the shaft 22 is provided with a ring gear 140, both of the gears 138 and 140 forming parts of the planet gear set 14. The gear set 14 comprises also planet gears 142 which are in mesh with the sun gear 138 and planet gears 144 which are in mesh with the planet gears 142 and with the ring gear 140. A spiral planet gear 146 is integrally connected with each of the gears 144, and the spiral gears are in mesh with a spiral sun gear 148 formed on the reaction element 24. The gears 146 and 148 together form the spiral gearing 36 hereinbefore referred to, and the reaction element 24 is rotatably and longitudinally movably disposed on the driven shaft 12. The planet gears 142, 144 and 146 are rotatably disposed on a carrier 150 which is connected with the shaft 12. The ring gear 140 is provided with teeth 152 on its outer periphery, and a pawl 154 carried by the transmission casing 134 is provided for engaging with the teeth 152. The pawl 154 and the teeth 152 together form the positive brake 38 for the ring gear 140 and the shaft 22.

The planetary gear set is such that when the reaction element 24, along with its sun gear 148, is held stationary and the shaft 18 and its sun gear 138 are driven through the clutch 16, the carrier 150 and the driven shaft 12 connected therewith are driven at a low ratio forward drive. When the ring gear 140 is driven through the clutch 20, and the reaction element 24 is held stationary, with the clutch 16 being disengaged, the carrier 150 and the shaft 12 are driven at an intermediate speed forward drive. When both of the clutches 16 and 20 are engaged and the reaction element 24 is allowed to rotate freely, the planet gearing 14 is locked up and the carrier 150 and the driven shaft 12 are driven at a one to one ratio with respect to the intermediate shafts 18 and 22 and the drive shaft 10. When the brake 38 is engaged to hold the ring gear 140 stationary and the clutch 16 is engaged and the reaction element 24 is released to rotate freely, the carrier 150 and the shaft 12 are driven at a low speed in reverse drive.

The reaction element 24 in its movement may be controlled by a collar 34, a toothed clutch 32, a positive type brake 26, a blocker 28 and a retaining mechanism 30 for holding the element from longitudinal movement, all hereinbefore referred to. The collar 34 is splined on the element 24 and is fixed against longitudinal movement on the element by suitable retainer rings, as shown. The brake 26 comprises stationary teeth 156 carried by the transmission casing 134 and brake teeth 158 formed on the reaction element 24 and adapted to mesh with the teeth 156. The blocker mechanism 28 comprises a blocker element 160 which is disposed on and may have limited oscillatory movement with respect to the element 24 and which is held in frictional engagement with a stationary part 162, fixed with respect to the transmission casing 134, by means of a spring 163 between the collar 34 and the blocker element 160. The blocker mechanism may be of any suitable construction and is such as to prevent rearward movement of the element 24 and block engagement of the teeth 158 with the teeth 156 when the element is rotating in a forward direction, that is, in the same direction as the drive shaft 10, and the blocker mechanism allows such movement of the element 24 and engagement of the teeth 158 with the teeth 156 when the rotation of the element 24 is in the opposite direction. The brake 26 is engaged automatically to hold the reaction element 24 stationary when either of the clutches 16 and 20 is engaged to provide a reduced speed ratio through the transmission. The spiral gearing 36 functions to move the reaction element 24 longitudinally of the shaft 12 either in one direction or in the other depending on the direction of reaction on the element 24 by the gearing. If the reaction on the element 24 is in the reverse direction, the spiral gearing urges the element longitudinally rearwardly of the transmission tending to engage the teeth 158 with the teeth 156, while if the reaction on the element 24 is in the opposite or forward direction, the element 24 is urged longitudinally forwardly of the transmission. Such action by the spiral gearing is promoted by the frictional retardation of rotation of the element 24 by the blocker element 160 frictionally engaging with the stationary part 162. When either of the clutches 16 and 20 is engaged, the reaction on the element 24 is in the reverse direction and the spiral gearing urges the element 24 rearwardly of the transmission. On such rotation and longitudinal movement of the element 24, the blocker mechanism 28 allows engagement of the teeth 158 with the teeth 156, and the element 24 is thereby braked to complete a low speed ratio drive through the transmission. When both of the clutches 16 and 20 are engaged to provide a direct drive through the transmission, the reaction on the element 24 is in the forward direction and the tendency of the spiral gearing 36 is to pull the element 24 forwardly of the transmission. The brake 26 is thereby disengaged, and the element 24 may thereafter rotate freely.

The locking mechanism 30 comprises bean-like elements 164 which are slidably disposed in suitable cavities in the casing 134 and are adapted to fit in a groove 166 in the reaction element 24 when the teeth 158 are interengaged with the teeth 156. A sleeve-like member 168 is disposed about the elements 164 and is provided with cams 170 on its inner surface for acting on the elements 164. The member 168 is adapted to be operated manually or by any suitable means, and when the reaction element 24 is moved rearwardly from its position as shown in Fig. 1 to engage the teeth 158 with the teeth 156, rotation of the member 168 will cause the cams 170 to lock the bean elements 164 in the groove 166 and thus prevent any forward movement of the reaction element 24. When the transmission is either in low or intermediate speed, with either of the clutches 16 and 20 engaged, the spiral gearing 36 acting on the reaction element 24 tends to cause the latter element to be moved forwardly of the transmission to disengage the positive brake 26 when the shaft 12 is allowed to drive, as when the power on the shaft 10 is decreased, and the spiral gearing 36 together with the reaction element 24 and the brake 26 thus act as a free-wheel brake on the reaction element 24 when the mechanism 30 is disengaged. When the mechanism 30 is engaged, with the transmission being conditioned either for low or intermediate forward drive, the bean elements 164 prevent forward movement of the reaction element 24 and thus function to prevent this free-wheeling action of the reaction element 24, and the shafts 10 and 12 are positively connected through the gear set 14 in both speed ratios.

When the brake 38 is engaged to condition the gear set 14 for reverse drive, the reaction on the element 24 is in a reverse direction which tends to move the element 24 rearwardly of the transmission to engage the brake 26. In this case, the collar 34 is utilized to hold the reaction element against such rearward movement for preventing engagement of the brake 26.

The clutch 32 comprises clutch teeth 172 on the carrier 150 and clutch teeth 174 on the collar 34. The collar is splined to the reaction element 24, and the teeth 174 are thus fixed with respect to the reaction element. The teeth 172 and 174 are slanted or beveled, as shown, and the clutch 32 may thus engage when the reaction element 24 rotates in a forward direction with respect to the carrier 150 but cannot engage if the relative direction of rotation of the element 24 is in the opposite direction. The clutch 32 is utilized for locking up the planetary gear set 14 when it is desired to provide a connection between the shaft 12 and the shaft 10, with only the clutch 20 being engaged, as for starting an internal combustion engine (not shown) connected with the shaft 10 by rotating the shaft 12. The clutch 16, in case the shaft 10 is not in rotation, cannot be engaged, as will be readily understood, since this clutch is of the centrifugal type actuated by rotation of the shaft 10. When the clutch 20 is engaged and the shaft 12 is rotated in the forward direction, the reaction on the reaction element 24 is in a forward direction and the spiral gearing 36 functions to move the element 24 forwardly of the transmission. Such movement of the reaction element 24 causes engagement of the clutch 32 to lock up the gear set 14 and complete the connection from the shaft 12 to the shaft 10. When the engine connected with the shaft 10 is started and begins to drive, then the carrier 150 tends to rotate faster in a forward direction than the reaction element 24 and the reaction on the element 24 is in the reverse direction, and the element 24 is moved rearwardly of the transmission and the clutch 32 is disengaged.

In brief, the operation of the transmission illustrated in Figs. 1 to 3 is as follows: When it is desired to provide forward drive at low ratio through the transmission, the clutch 16 is conditioned for operation by applying fluid under pressure behind the piston 44 to move the piston and the associated parts including the member 60 to bring the lugs 62 of the latter member into engagement with the bottoms 82 of the slots 64. The clutch 16 is then conditioned for engagement, and upon increasing the speed of the shaft 10, the weights 86 will move outwardly and will move the pressure plate 74 to engage the clutch disc 100 between the fly-wheel 40 and the clutch plate 74. The clutch 16, on being so engaged will drive the shaft 18 and the planetary gear set 14, and the spiral gearing 36 will cause a reaction on the reaction element 24 in the reverse direction and will move it rearwardly of the transmission. Such movement of the reaction element 24 will disengage the blocker mechanism 28 and will engage the brake 26 to complete the low speed power train through the transmission. To shift the transmission to intermediate speed, the clutch 16 is disengaged by draining the fluid from behind the piston 44, and the clutch 20 is engaged by applying fluid under pressure to the piston 106 and between the piston parts 108 and 46. Clutch 20 will then drive the planet gear set 14 through the shaft 22. The brake 26 will remain engaged, and the intermediate speed power train through the transmission will be completed. It will be understood that both of these power trains are of the free wheeling type due to the free wheeling action of the reaction element 24; however, both of the drives may be made positive by engaging the mechanism 30, as has been hereinbefore described. To shift the transmission to direct drive, the clutch 16 is again engaged, with the clutch 20 remaining engaged, by applying fluid under pressure behind the piston 44. The planet gear set 14 will be locked up and there will be a direct drive between the shafts 10 and 12. The brake 26 for the element 24 will be disengaged due to the action of the spiral gearing 36, as has been hereinbefore described. For reverse drive, the brake 38 is engaged, and the reaction element 24 is held against rearward longitudinal movement by use of the collar 34, and the clutch 16 is engaged to complete the low speed reverse drive. For causing rotation of the shaft 10 by rotating the shaft 12 as for starting a driving engine, the second speed clutch 20 is engaged, and the action of the spiral gearing 36 will engage the clutch 32 to lock up the planetary gear set and complete a drive from the driven shaft 12 to the drive shaft 10.

Referring to Fig. 4 of the drawings, the modification therein shown differs from the construction shown in Figs. 1 to 3 in providing a simpler positive type brake for the reaction element 24 and in providing a somewhat different type of positive brake for the ring gear 140 of the planet gear set 14. The brake for the reaction element 24 in this embodiment of the invention comprises simply brake teeth 174 fixed with respect to the reaction element and a pawl 176 which is adapted to engage with the teeth 174 to hold the teeth and the reaction element stationary. The brake for the ring gear 140 for use in reverse comprises a sleeve 178 splined to the shaft 22 and having teeth 180 engageable with stationary teeth 182. The brake for the shaft 22 may be engaged simply by moving the sleeve 178 to engage the teeth 180 with the teeth 182. This embodiment of the invention operates similarly to the embodiment first described with the exception that the brake for the reaction element 24 is engaged and disengaged manually.

Referring to Fig. 5 of the drawings, the embodiment of the invention shown in this figure is quite similar to that shown in Figs. 1 to 3 differing only from the latter embodiment in having a different brake structure for the reaction element 24. The brake structure for the reaction element 24 in this embodiment comprises a one-way roller brake unit 184 which is connected in series with and is made effective by a positive type brake comprising teeth 186 and a rotationally fixed pawl 188 adapted to engage with the teeth. A friction brake 190 is provided for the reaction element 24 and is disposed in parallel with the one-way brake structure. This embodiment operates quite similarly to the embodiment shown in Figs. 1 to 3 with the one-way brake unit 184 operating similarly to the spiral gearing 36 and the positive brake 26 acting on the reaction element 24. The friction brake 190 functions quite similarly to the locking mechanism 30 in the first embodiment of the invention and may be applied to provide a positive drive in either low or intermediate speed between the drive and driven shafts.

I wish it to be understood that my invention is not to be limited to the specific constructions and arrangements shown and described except only insofar as the claims may be so limited, as it will be apparent to those skilled in the art that changes may be made without departing from the principles of the invention.

I claim:

1. In a transmission, the combination of a drive shaft, a driven shaft, a planetary gear set connected to drive said driven shaft and including a sun gear, a ring gear, a first planet gear in mesh with said sun gear, a second planet gear in mesh with said first planet gear and with said ring gear, a third planet gear integrally connected with one of said first two named planet gears, and a sun gear constituting a reaction gear and in mesh with said third planet gear, a clutch for connecting said drive shaft with said first named sun gear to provide a power train between said shafts at a certain speed ratio, a clutch for connecting said drive shaft with said ring gear to provide a power train between said shafts at another speed ratio, and means for braking said reaction gear to provide a reaction point for the gear set to complete both of said power trains, said braking means comprising a one-way roller brake the inner race of which is formed on a hub of said reaction sun gear and the outer race of which has external teeth, a non-rotatable pawl adapted to engage the teeth of said outer roller race to prevent rotation thereof and to thereby render the one-way brake effective, a brake drum connected to the hub of said reaction sun gear, and selectively operable friction means for stopping the rotation of said drum and for thereby braking the reaction sun gear in both directions of rotation.

2. In a transmission, the combination of a drive shaft, a driven shaft, a planetary gear set connected to drive said driven shaft and including a sun gear, a ring gear, a first planet gear in mesh with said sun gear, a second planet gear in mesh with said first planet gear and with said ring gear, a third planet gear integrally connected with one of said first two named planet gears, and a sun gear constituting a reaction gear and in mesh with said third planet gear, clutch means for connecting said drive shaft with said first named sun gear to provide a power train between said shafts at a reduced speed ratio, the initial movement of said clutch means toward clutching engagement being hydraulically instigated and the final movement into clutching engagement being responsive to a predetermined speed of rotation of the drive shaft, hydraulically operated clutch means for connecting said drive shaft with said ring gear to provide a power train between said shafts at an intermediate speed ratio, and means for braking said reaction gear to provide a reaction point for the gear set to complete both of said power trains, said braking means comprising a one-way roller brake the inner race of which is formed on a hub of said reaction sun gear and the outer race of which has external teeth, a non-rotatable pawl adapted to engage the teeth of said outer roller race to prevent rotation thereof and thereby render the one-way brake effective, a brake drum connected with the hub of said reaction sun gear, and selectively operable friction means for stopping the rotation of said drum and for thereby braking the reaction sun gear in both directions of rotation.

DONALD W. KELBEL.